J. F. CAVANAGH & W. W. BARDSLEY.
MEASURING INSTRUMENT.
APPLICATION FILED JULY 29, 1910.
997,648.
Patented July 11, 1911.
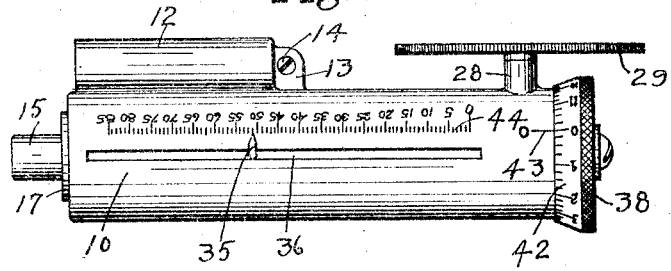
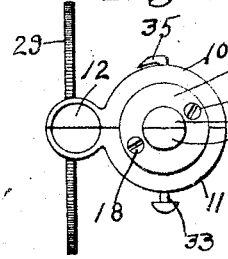
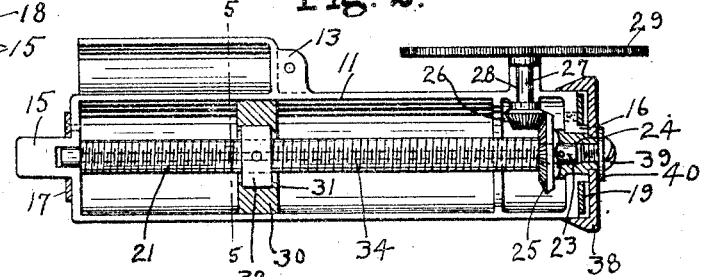
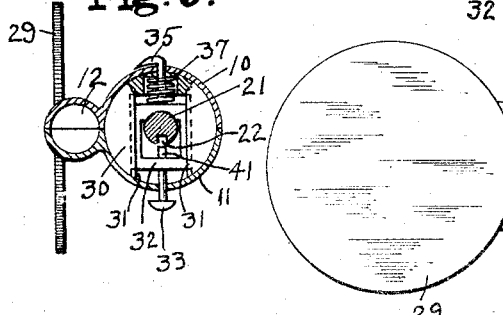
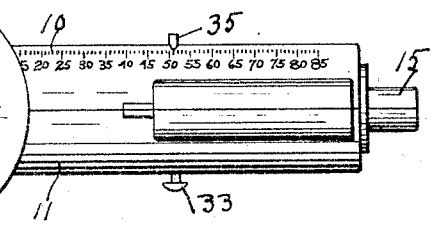
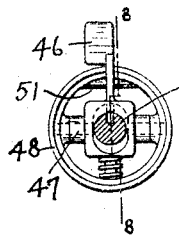
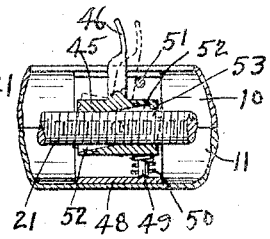
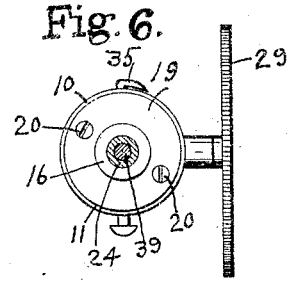
Witnesses
E. I. Ogden
Herbert L. Kelley
Inventors
John F. Cavanagh.
Willard W. Bardsley.
By
Howard G. Bau
Attorney

UNITED STATES PATENT OFFICE.

JOHN F. CAVANAGH AND WILLARD W. BARDSLEY, OF PROVIDENCE, RHODE ISLAND, ASSIGNORS TO PAUL NEWMAN, OF PROVIDENCE, RHODE ISLAND.

MEASURING INSTRUMENT.

997,648. Specification of Letters Patent. Patented July 11, 1911.

Application filed July 29, 1910. Serial No. 574,433.

*To all whom it may concern:*

Be it known that we, JOHN F. CAVANAGH and WILLARD W. BARDSLEY, citizens of the United States, residing at the city of Providence, in the county of Providence and State of Rhode Island, have invented certain new and useful Improvements in Measuring Instruments, of which the following is a specification, reference being had therein to the accompanying drawing.

This invention relates to measuring devices, and particularly to that type of such mechanisms which are employed for making lineal measurements by moving the instrument along the surface to be measured, such as a log or a floor.

One of the objects of the invention is to provide an improved instrument of the type referred to which will enable the mechanism to be quickly set to zero.

Another object is to provide an improved instrument of the character described having separate scales for feet and inches.

Other objects are to provide improvements all tending to economy in construction, simplicity of operation, certainty of action, and to so construct the device that it can be readily cleaned or repaired.

To these ends the invention consists in the construction and combination of parts substantially as hereinafter described and claimed.

Of the accompanying drawings: Figure 1— is a top view of a measuring instrument embodying our invention. Fig. 2— is a similar view with the upper member of the casing or barrel removed, and some of the parts being shown in section. Fig. 3— is a side elevation of the instrument. Fig. 4— is an end view from the right of Fig. 3. Fig. 5— represents a section on line 5—5 of Fig. 2. Fig. 6— is an end view from the right of Fig. 2, but with the measuring head or cap removed. Fig. 7— is a view similar to a portion of Fig. 5, and illustrating a modification. Fig. 8— represents a section on line 8—8 of Fig. 7.

Similar reference characters indicate the same or similar parts in all of the views.

Referring first to Figs. 1 to 5 inclusive, the barrel or casing is formed of two semi-cylindrical parts 10 and 11, said parts having at one end semi-cylindrical extensions which, when opposite each other as shown in Fig. 4, form a socket 12 into which the end of a handle can be introduced when it is desired that the instrument shall be so operated. The two parts 10 and 11 are formed also with flat web portions 13 and are connected by means of a screw 14. Said parts also have end projections to form bearings 15 and 16 for the screw shaft hereinafter described. A washer 17 secured by screws 18 at one end, and a washer 19 secured by screws 20 to the other end, aid in holding the two parts of the casing or barrel together, said washers encircling the half lugs which provide the bearings 15 and 16. Mounted in said bearings is a screw threaded shaft 21 having a longitudinal groove 22 (see Fig. 5).

Secured to the reduced end 23 of the shaft 21 is the hub 24 of a bevel pinion 25, said hub 24 being mounted in the bearing 16. The pinion 25 meshes with a bevel pinion 26 carried by the inner end of a shaft 27 mounted in a short lateral bearing 28, said shaft having a driving wheel 29 secured to its outer end, said driving wheel constituting the measuring disk of the instrument. Preferably said wheel or disk has its edge milled or suitably roughened so that when the instrument is run along a surface to be measured, the rotary movement of said wheel or disk will be imparted through the pinions described to the screw threaded shaft 21.

Mounted in the barrel so as to slide longitudinally therein is a block 30 having parallel ways 31 for a frame 32 (see Figs. 2 and 5), said frame having an internally threaded portion which normally engages the thread of shaft 21. Said frame has a finger piece 33 projecting through a slot 34 formed in the barrel (see dotted lines in Fig. 2). A pointer 35 is carried by the frame and projects through a slot 36 in the barrel, which slot is substantially diametrically opposite the slot 34, the barrel being externally provided with a suitable scale to coöperate with said pointer in the manner presently described. A spring 37 is coiled about the spindle of the pointer 35, said spring being mounted in a recess in the block 30 and confined between the base of said recess and the frame 32, said spring acting to normally hold the said frame or nut in engagement with the screw threaded shaft. Whenever it is desired to shift the pointer independently, such as when it is to be returned to zero, the user presses against the knob at the outer end of the finger piece 33 against the action of spring 37, so as to disengage the threaded portion of the frame or nut from the screw threaded shaft, and then the entire block 30 and the frame nut and pointer can be slid along the barrel or casing. During such movement it is desirable that there shall be no rotative movement of the screw threaded shaft, either accidental or otherwise. Such movement is prevented by the lug 41 of the frame entering the groove 22 and retaining such engagement with the groove as long as the threaded portion of the frame is out of engagement with the screw threaded shaft.

The scale with which the pointer 35 coöperates is preferably employed to indicate feet. In order that inches and fractions thereof may also be measured, we provide a head or cap 38 which is secured to the hub 24, as by means of a screw 39 and washer 40. As the hub 24 is secured to the shaft 21, the cap 38 must rotate with the said shaft. The periphery of said cap is provided with a scale 42 to coöperate with a zero point 43 on the barrel to indicate inches and fractions thereof.

In use the instrument is simply run along the surface to be measured with the disk 29 in contact with said surface, the proportions of the periphery of the disk and of the pinions and the pitch of the screw threaded shaft being such, relatively to the scale markings, as to indicate measurements according to any preferred scale which may be, as above mentioned, feet and inches and fractions thereof. Of course we do not limit ourselves to any particular scale measurements.

When one measurement has been taken, it becomes essential to return the parts to zero. In order that it will not be necessary to run the mechanism backward, the disengageable nut mechanism described is employed. All that the user needs to do is to actuate the finger piece 33 in the manner hereinbefore described so as to release the threaded portion of the frame 32 from the shaft, and then slide the block 30, and of course the frame 32 also, along until the pointer 35 is at the zero of the longitudinal scale 44. If at the time of this operation the shaft 21 is in such position that the groove 22 is not opposite the lug 41, the user turns the shaft 21 by means of the head or cap 38 to bring the zero of its scale 42 opposite the zero mark 43 of the barrel. The parts are so constructed and connected that this movement of the head or cap will rotate the shaft 21 and bring the groove 22 of the latter in line with the lug 41, and so permit the frame nut to be disengaged from the shaft in the manner described.

We do not limit ourselves to the particular means whereby the nut may be displaced or disengaged from the actuating shaft 21. Instead of being shiftable in a plane directly transverse of the axis of the shaft 21, it may be mounted to tilt as indicated in Figs. 7 and 8 in which the nut 45, and a handle 46 projecting through a slot in the barrel or casing, is mounted on trunnions 47 supported by a sliding ring 48. Said ring has a pin 49 about which a spring 50 is coiled, said spring having a tendency to normally hold the parts in the position shown in full lines of Fig. 8. The ring also carries a stop 51 behind the handle 46. The tilting nut is formed with inclined recesses 52, which are internally smooth, the portions of the nut which bear against the shaft 21 when in the position shown in full lines in Fig. 8 being internally threaded. At one end the nut is provided with a lug 53 which is adapted to serve the same purpose as the lug 41 shown in Fig. 5.

With the device constructed as shown in Figs. 7 and 8 when the threaded portions of the nut are in engagement with the shaft, the ring 48 will slide along the barrel or casing, and the handle 46, or any other suitable projection from the nut, will coöperate with the external scale to indicate the measurements desired. To re-set to zero, the handle 46 will be actuated to tilt or operate the nut to the position indicated by dotted lines in Fig. 8, the threaded portions of the nut being then disengaged from the shaft while the lug 53 enters the longitudinal groove in said shaft, after which the nut can be slid along to zero position.

We do not limit ourselves to making the barrel or casing in two parts. As indicated in Figs. 6 and 7, the barrel may be a continuous tube. And as indicated in Figs. 6, 7 and 8 the handle socket 12 may be omitted, in which case the barrel or casing may be grasped by the hand, or a suitable handle may be affixed to the projecting bearing 15.

We claim:

1. A measuring instrument comprising an inclosing casing, a screw threaded shaft in said casing, an actuating wheel for said shaft having an exposed periphery to engage a surface to be measured, a nut within said casing having a plurality of integral threads to coöperate with the threads of said shaft, and a handle to said nut projecting through said casing whereby said nut may be readily released from said shaft and moved bodily relatively thereto, a pointer carried on said nut, and a scale on said casing to coöperate with said pointer.

2. A measuring instrument comprising a screw threaded shaft, an actuating wheel therefor, a sliding member having a pointer, a threaded member carried by said sliding member and bodily movable relatively thereto disconnect it from the shaft, a scale for coöperating with said pointer, and means for preventing rotation of the shaft when said threaded member is disconnected from the shaft.

3. A measuring instrument comprising a cylindrical barrel or casing having a slot, a cylindrical slide mounted in said barrel, a nut having a pointer projecting through said slot, the casing having a scale to coöperate with said pointer, a threaded shaft extending through said nut, an actuating wheel for said shaft, means for disengaging the nut from said shaft, and means for locking the shaft when the nut is disengaged therefrom.

4. A measuring instrument comprising a cylindrical casing or barrel having a slot and a scale along said slot, a nut movable longitudinally of the barrel and having a pointer projecting through said slot, a cap rotatably mounted on one end of the barrel and having a scale, said cap being secured against longitudinal movement on the barrel, a screw-threaded shaft in the barrel and connected to said head or cap, the nut being laterally movable to engage and disengage the threads of the shaft, an actuating wheel having an exposed periphery to engage a surface to be measured, and means connecting said wheel and shaft whereby the latter is driven by the former.

5. A measuring instrument comprising a cylindrical casing or barrel having a slot and a scale along said slot, a nut movable longitudinally of the barrel and having a pointer projecting through said slot, a cap rotatably mounted on one end of the barrel and having a scale, said cap being secured against longitudinal movement on the barrel, a screw-threaded shaft in the barrel and connected to said head or cap, an actuating wheel for said shaft, and means whereby the nut and shaft may be disengaged for resetting to zero.

6. A measuring instrument comprising a casing or barrel formed of two semi-cylindrical metal shells, means for securing said shells together at their ends, a screw threaded shaft mounted in said barrel, an actuating wheel therefor, a nut in said barrel and operatively engaged with said shaft, a pointer carried by said nut, and a scale to coöperate with said pointer.

7. A measuring instrument comprising a casing formed of two semi-cylindrical parts having end projections to form bearings, washers fitted to said projections, means for holding said washers in place whereby the washers hold the parts of the barrel together, a threaded shaft mounted in said bearings, a nut engaged with said shaft and having a pointer, and a scale to coöperate with said pointer.

In testimony whereof we affix our signatures in presence of two witnesses.

JOHN F. CAVANAGH.
WILLARD W. BARDSLEY.

Witnesses:
HERBERT L. KELLEY,
E. I. OGDEN.